US008676421B2

(12) United States Patent
Lee et al.

(10) Patent No.: US 8,676,421 B2
(45) Date of Patent: Mar. 18, 2014

(54) METHOD FOR ORGANIZING AN ELECTRIC ENERGY AND A KINETIC ENERGY OF AN ELECTRIC VEHICLE

(75) Inventors: Cheng-Hsin Lee, Kaohsiung (TW);
Chin-Ming Chang, Kaohsiung (TW);
Shih-Tsung Huang, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 0 days.

(21) Appl. No.: 13/536,748

(22) Filed: Jun. 28, 2012

(65) Prior Publication Data

US 2013/0018539 A1    Jan. 17, 2013

(30) Foreign Application Priority Data

Jul. 14, 2011    (TW) .............................. 100124901 A (51) Int. Cl.
| | |
|---|---|
| *B60W 20/00* | (2006.01) |
| *B60W 10/00* | (2006.01) |
| *B60W 10/24* | (2006.01) |
| *B60W 10/26* | (2006.01) |
| *B60K 6/00* | (2007.10) |
| *B60K 6/42* | (2007.10) |
| *H02J 7/14* | (2006.01) |

(52) U.S. Cl.
USPC ............. 701/22; 903/903; 903/907; 903/914; 903/930

(58) Field of Classification Search
CPC ............ B60W 20/00; B60K 6/00; B60K 6/42
USPC ...................... 701/22, 81, 123, 490; 318/587; 320/104, 109, DIG. 34; 903/903, 907, 903/914, 930; 136/248
See application file for complete search history.

(56) References Cited

U.S. PATENT DOCUMENTS

| | | | |
|---|---|---|---|
| 7,489,048 B2 * | 2/2009 | King et al. ................... 307/10.1 |
| 7,649,273 B2 * | 1/2010 | Zillmer et al. .............. 290/40 C |
| 7,728,546 B2 * | 6/2010 | Tanaka et al. ................. 320/104 |
| 8,022,663 B2 * | 9/2011 | Davis et al. ................... 320/104 |
| 8,022,666 B2 * | 9/2011 | Li ................................. 320/109 |
| 8,442,727 B2 * | 5/2013 | Yamamoto et al. .............. 701/49 |
| 2007/0137909 A1 * | 6/2007 | Zillmer et al. ............... 180/65.2 |
| 2008/0035716 A1 * | 2/2008 | Hafkin et al. .............. 229/101.2 |
| 2008/0053716 A1 * | 3/2008 | Scheucher ..................... 180/2.1 |
| 2008/0083576 A1 * | 4/2008 | Read ............................. 180/165 |

(Continued)

FOREIGN PATENT DOCUMENTS

| | | |
|---|---|---|
| CN | 1077165 A | 10/1993 |
| CN | 1365904 A | 8/2002 |
| CN | 101683872 A | 3/2010 |

*Primary Examiner* — Mary Cheung
*Assistant Examiner* — Atul Trivedi
(74) *Attorney, Agent, or Firm* — Morris Manning & Martin LLP; Tim Tingkang Xia, Esq.

(57) ABSTRACT

A method for organizing an electric energy and a kinetic energy of an electric vehicle includes the following steps. A plurality of electro-motor modules having different grade of kinetic energy are provided. A plurality of battery modules having different grade of electric energy are provided. A plurality of electric vehicle performances are preset, and one of the battery modules on the electric vehicle is arranged in accordance with the electric vehicle performances. One of the electro-motor modules on the electric vehicle is arranged in accordance with the electric vehicle performances and the one of the battery modules.

7 Claims, 4 Drawing Sheets

(56) References Cited

U.S. PATENT DOCUMENTS

| | | | |
|---|---|---|---|
| 2008/0093143 A1* | 4/2008 | Harrison | 180/165 |
| 2008/0111508 A1* | 5/2008 | Dasgupta et al. | 318/139 |
| 2008/0113226 A1* | 5/2008 | Dasgupta et al. | 429/9 |
| 2008/0258682 A1* | 10/2008 | Li | 320/109 |
| 2008/0308335 A1* | 12/2008 | Anderson et al. | 180/165 |
| 2009/0112495 A1* | 4/2009 | Center | 702/63 |
| 2009/0118094 A1* | 5/2009 | Hsieh et al. | 477/110 |
| 2009/0177345 A1* | 7/2009 | Severinsky et al. | 701/22 |
| 2010/0151989 A1* | 6/2010 | Read | 477/4 |
| 2010/0250043 A1* | 9/2010 | Scheucher | 701/22 |
| 2010/0292880 A1* | 11/2010 | McGrogan et al. | 701/22 |
| 2010/0304920 A1* | 12/2010 | Simon | 477/3 |
| 2010/0305792 A1* | 12/2010 | Wilk et al. | 701/22 |
| 2011/0014501 A1* | 1/2011 | Scheucher | 429/7 |

\* cited by examiner

METHOD FOR ORGANIZING AN ELECTRIC ENERGY AND A KINETIC ENERGY OF AN ELECTRIC VEHICLE

CROSS-REFERENCE TO RELATED APPLICATION

This application claims the benefit of Taiwan Patent Application No. 100124901, filed on Jul. 14, 2011, which is hereby incorporated by reference for all purposes as if fully set forth herein.

BACKGROUND OF THE INVENTION

1. Field of Invention

The present invention relates to a method for organizing an electric energy and a kinetic energy of an electric vehicle, and more particularly to different method for adjustably organizing electric energy with kinetic energy at the same chassis in accordance with different performance table.

2. Related Art

Generally, the performance of conventional electric vehicle is fixed. Even though some power of an electromotor of the electric vehicle can be adjusted, the adjusted result belongs to a slight adjustment so as not to greatly change the performance of the electric vehicle. In addition, China patent (publication no. CN 1077165) discloses that two electromotors are arranged in advance, and output kinetic energies together by coupling a clutch if necessary, thereby increasing a torsion performance, wherein the electric vehicle has a technology of "the combination of different kinetic energy of the electro-motors." However, it is necessary for this design to convey two electro-motors at the same time, and thus extra loading can cause a waste of energy resource.

Furthermore, the electric energy of a battery module of conventional electric vehicle can be adjusted by generally replacing with new battery module. China patent (application no. CN 01101414.8) discloses that a plurality of battery units serially electrically connected to one another are arranged in advance, the electric vehicle only uses one of the battery units at the same time, and the source of the electric energy will be automatically switched from empty battery unit to next battery unit, when the electric energy of the battery unit empty, wherein the electric vehicle has a technology of "separable battery units." However, it is necessary for this design to convey the plurality of battery units at the same time, and thus extra loading can cause a waste of energy resource.

In addition, China patent (application no. CN 200910178603.X) discloses that the balance of a vehicle weight is requested to be kept when a plurality of battery units, wherein the electric vehicle has a technology of "the combination of different kinetic energy of the electro-motors." However, this patent is mainly applied to an electric motorcycle, and this design only considers that the number of battery units is constant. This patent fails to disclose the balance of the vehicle weight can be also kept, when the number of battery units is changed.

Furthermore, recently it is popular that a person works in a city at working time and travels with family at holiday time. A road condition of the city road is different from the road condition of the countryside road, the highway or mountain road, and one person or many persons can be conveyed in the electric vehicle. According to the different road conditions the number of conveyed person, the outputted kinetic energy, the consumed energy resource, etc. of the electric vehicle are different accordingly. Since the performance of the above-mentioned electric vehicle cannot be further changed, the first case is that the person who works in the city suitably uses the electric vehicle adapted for conveying one person (two persons), having an electromotor with small capacity of kinetic energy, and having a battery module with small capacity of electric energy; and the second case is that the person who travels with family suitably uses the electric vehicle adapted for conveying many persons, having an electromotor with large capacity of kinetic energy, and having a battery module with large capacity of electric energy. In other words, according to the design of the current electric vehicle, there is no single electric vehicle which can be changed to have different performances for the first and second cases. Thus, some person who works in the city and travels with family uses multiple electric vehicles having different performances for the first and second cases, so as to cause a waste of resource.

Therefore, it is required to provide a method for organizing an electric energy and a kinetic energy of an electric vehicle capable of solving the forgoing problems.

SUMMARY OF THE INVENTION

The present invention is directed to a method for organizing an electric energy and a kinetic energy of an electric vehicle in accordance with the necessary electric vehicle performance. Furthermore, after the electric vehicle performance is changed, the method can easily organize another electric energy and kinetic energy of the electric vehicle.

The present invention provides a method for organizing an electric energy and a kinetic energy of an electric vehicle, the method comprising the following steps of: providing a plurality of electro-motor modules having different grade of kinetic energy; providing a plurality of battery modules having different grade of electric energy; presetting a plurality of electric vehicle performances, and arranging one of the battery modules on the electric vehicle in accordance with the electric vehicle performances; and arranging one of the electro-motor modules on the electric vehicle in accordance with the electric vehicle performances and the one of the battery modules.

In this embodiment, the step of presetting the plurality of electric vehicle performances and arranging the battery module in accordance with the electric vehicle performances comprises the following steps of: presetting the minimum value of a travelable mileage of the electric vehicle; and calculating the electric energy of selectable battery module in accordance with the minimum value of the travelable mileage, wherein the formula for calculating the electric energy of selectable battery module is: $B_E > R \times C_P$, $B_E$ is the electric energy of the battery module, R is the travelable mileage of the electric vehicle, and $C_P$ is an consumed power.

In this embodiment, the step of presetting the plurality of electric vehicle performances and arranging the battery module in accordance with the electric vehicle performances comprises the following steps of: presetting the maximum value of an arrangement space of the battery module; and calculating a battery energy per volume in accordance with the maximum value of the arrangement space of the battery module, wherein the formula for calculating the battery energy per volume is: $P_{LE} > B_E/B_V$, $P_{LE}$ is the battery energy per volume, $B_E$ is the electric energy of the battery module, and $B_V$ is a volume of the battery module.

In this embodiment, the step of presetting the plurality of electric vehicle performances and arranging the battery module in accordance with the electric vehicle performances comprises the following steps of: presetting the maximum value of an acceptable weight of the battery module; and calculating a battery energy per weight in accordance with the maximum value of the acceptable weight of the battery module, wherein the formula for calculating the battery energy per weight is: $P_{WE} > B_E/B_W$, $P_{WE}$ is the battery energy per weight, $B_E$ is the electric energy of the battery module, and $B_W$ is a weight of the battery module.

In this embodiment, the step of presetting the plurality of electric vehicle performances and arranging the battery module in accordance with the electric vehicle performances comprises the following steps of: presetting the minimum value of a useful loading of the electric vehicle; and calculating a weight of the battery module in accordance with the minimum value of the useful loading of the electric vehicle, wherein the formula for calculating the weight of the battery module is: $B_W < W_C \times F_L - L_P$, $B_W$ is the weight of the battery module, $W_C$ is an empty weight of the electric vehicle, $F_L$ is a loading coefficient of a chassis, and $L_P$ is the useful loading of the electric vehicle.

In this embodiment, the step of arranging the electro-motor module in accordance with the electric vehicle performances and the battery module comprises the following steps of: presetting the maximum value of a charge/discharge rate of the battery module; and calculating a kinetic energy value of the electro-motor in accordance with the maximum value of the charge/discharge rate of the battery module, wherein the formula for calculating the kinetic energy value of the electro-motor is: $M_P < C\text{-Rate} \times B_E$, $M_P$ is the kinetic energy value of the electro-motor, C-Rate is the charge/discharge rate of the battery module, and $B_E$ is the electric energy of the battery module.

The present invention is characterized in that: the electric energy and the kinetic energy matched with each other of the electric vehicle are adjustably designed by adjustable matching concept. According to the requirement of a driver, different electric energy and kinetic energy can be organized in the same chassis so as to produce different performance grade (i.e. different vehicle performance). When the vehicle performance is changed, it is not necessary to replace the electric vehicle of the present invention. The electric vehicle of the present invention can meet the requirement of short-term changing vehicle performance suitably for the use of a rental. For example, the small city vehicle having short travelable mileage can become the small city vehicle having long travelable mileage by increasing battery modules, the single-person city vehicle having short travelable mileage can become the multi-persons sport utility vehicle having long travelable mileage by increasing battery modules. Or, the electro-motor modules and the battery modules of the present invention having high cost can be shared by a user group or relatives of a family, thereby economizing the resource. The design of the electric vehicle of the present invention has the following advantages: according to different requirement, the electric vehicle performance grade can be adjusted; the weight of unnecessary battery module can be decreased; and the community of the chassis can be increased.

In order to make the aforementioned and other objectives, features and advantages of the present invention comprehensible, embodiments are described in detail below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
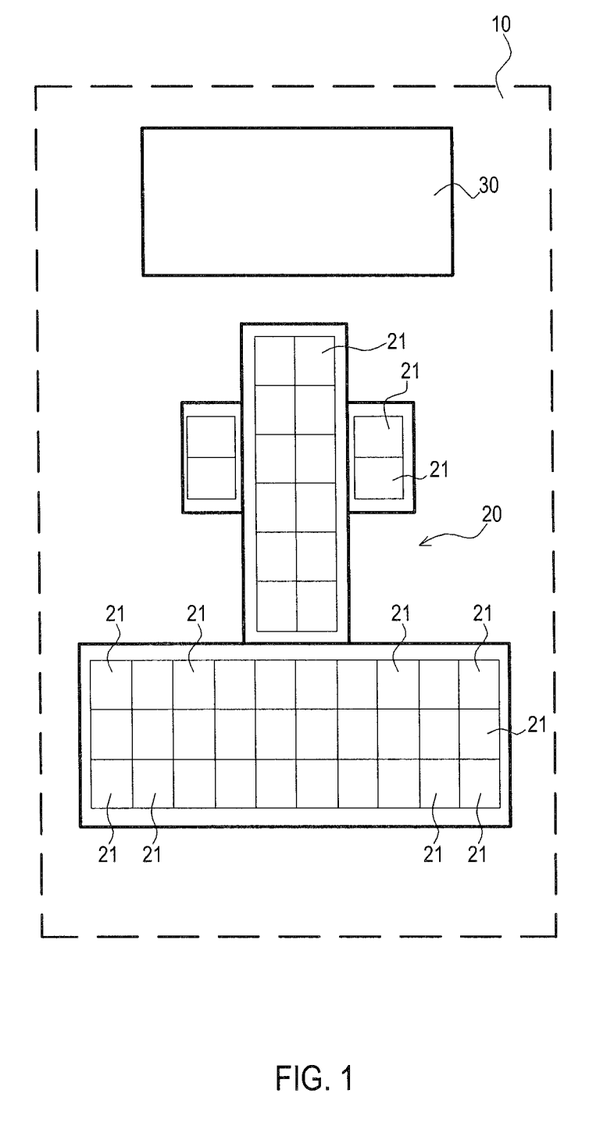
FIG. 1 is a schematic view showing that electro-motor modules and battery modules of an electric vehicle are arranged according to an embodiment of the present invention.
Figure 2:
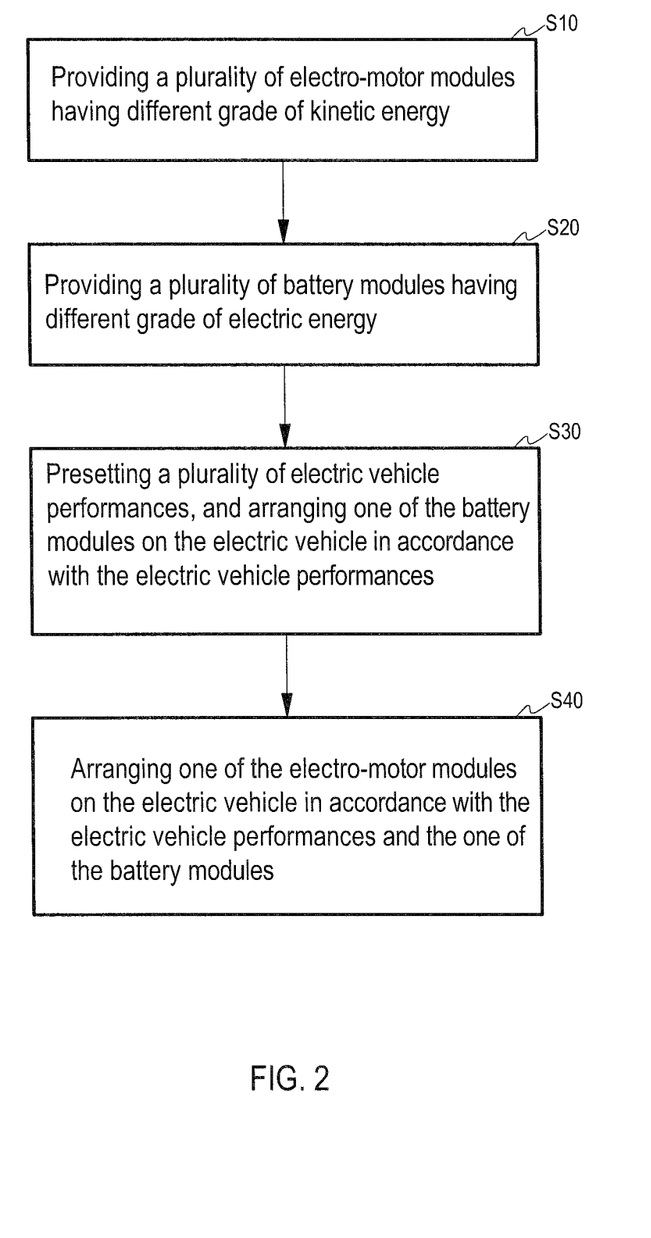
FIG. 2 is a flow chart showing a method for organizing an electric energy and a kinetic energy of an electric vehicle according to an embodiment of the present invention according to an embodiment of the present invention.

FIG. 1 is a schematic view showing that electro-motor modules and battery modules of an electric vehicle are arranged. FIG. 2 is a flow chart showing a method for organizing an electric energy and a kinetic energy of an electric vehicle according to an embodiment of the present invention. The method for organizing the electric energy and the kinetic energy of the electric vehicle in this embodiment includes steps as follows. In step S10, a plurality of electro-motor modules 30 having different grade of kinetic energy are provided. In step S20, a plurality of battery modules 20 having different grade of electric energy are provided. Preferably, each battery modules 20 is constituted by a plurality of basic battery units 21 which each has the same electric energy and are electrically coupled. In step S30, a plurality of electric vehicle performances are preset (different combination of the electric vehicle performances can define different vehicle performances), and one of the battery modules 20 is arranged on the electric vehicle 10 in accordance with the electric vehicle performances. Then, in the S40, one of the electro-motor modules 30 is arranged on the electric vehicle 10 in accordance with the electric vehicle performances and the one of the battery modules 20.

The above-mentioned vehicles having different combination of the electric vehicle performances can be a small city vehicle having short conveying distance or a sport utility vehicle having long conveying distance, for example. The relative data which affect the battery module 20 and the electro-motor module 30 of the electric vehicle 10 can include the following items but is not limited thereto. The minimum value of a travelable mileage of the electric vehicle 10 is preset, the maximum value of an arrangement space of the battery module 20 is preset, the maximum value of an acceptable weight of the battery modules 20 is preset, the minimum value of an useful loading of the electric vehicle 10 is preset, the maximum value of a charge/discharge rate of the battery module 20 is preset, and so on.

Figure 3:
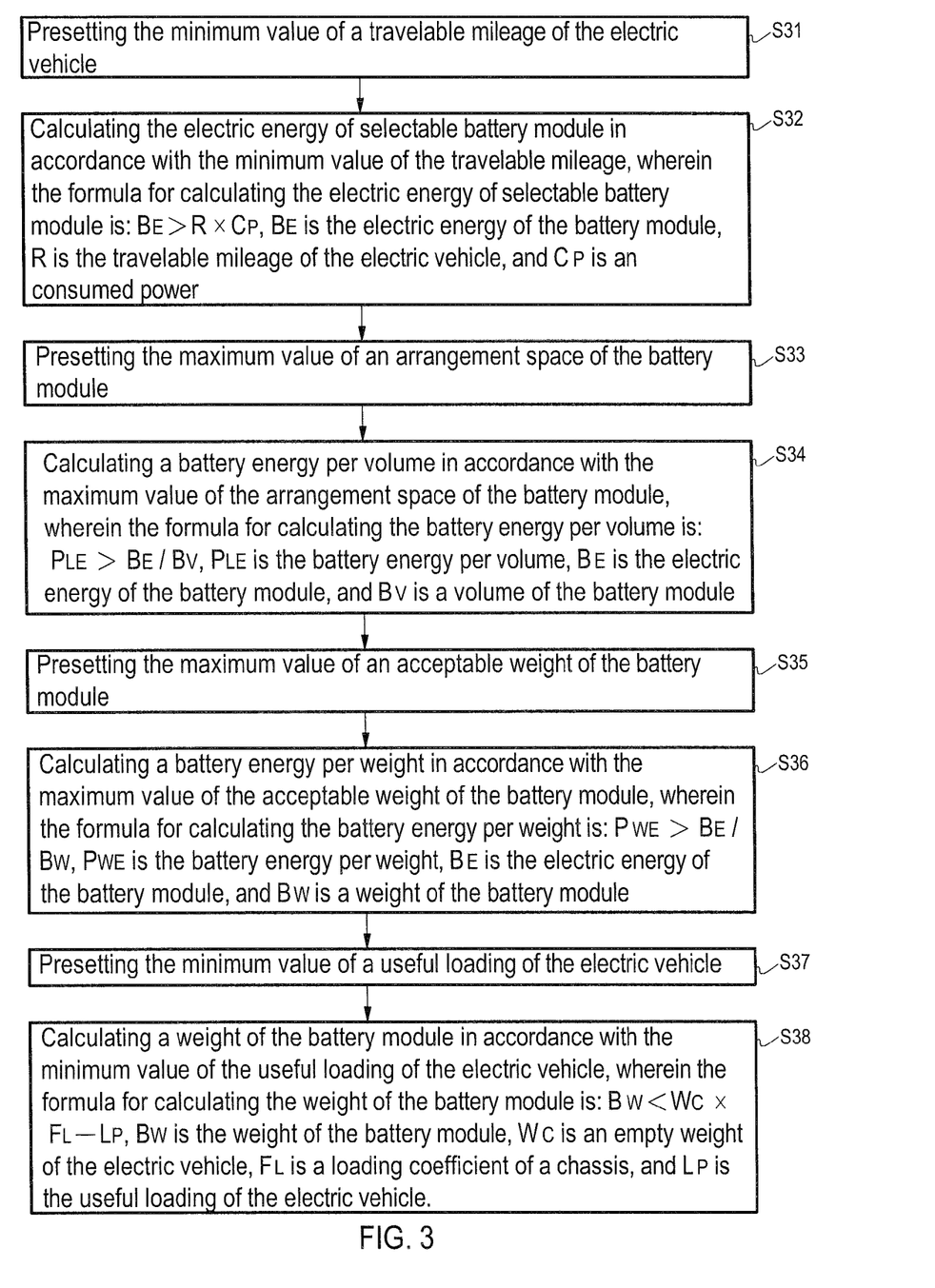
FIG. 3 is a flow chart showing the step of presetting the plurality of electric vehicle performances and arranging the battery module in accordance with the electric vehicle performances according to an embodiment of the present invention.

AS shown in FIG. 3, in this embodiment, step of presetting the electric vehicle performances and arranging the battery module 20 in accordance with the electric vehicle performances (i.e. step S30) can include the following steps S31 to S38 but is not limited thereto. In step S31, the minimum value of a travelable mileage of the electric vehicle 10 is preset. In step S32, the electric energy of selectable battery module 20 is calculated in accordance with the minimum value of the travelable mileage. The formula for calculating the electric energy of selectable battery module 20 is: $B_E > R \times C_P$ (formula 1), wherein $B_E$ is the electric energy of the battery module, R is the travelable mileage of the electric vehicle, and $C_P$ is a consumed power. In step S33, the maximum value of an arrangement space of the battery module 20 is preset. In step S34, a battery energy per volume is calculated in accordance with the maximum value of the arrangement space of the battery module 20. The formula for calculating the battery energy per volume is: $P_{LE} > B_E / B_V$ (formula 2), wherein $P_{LE}$ is the battery energy per volume, $B_E$ is the electric energy of the battery module, and $B_V$ is a volume of the battery module. In step S35, the maximum value of an acceptable weight of the battery module 20 is preset. In step S36, a battery energy per weight is calculated in accordance with the maximum value of the acceptable weight of the battery module 20. The formula for calculating the battery energy per weight is: $P_{WE} > B_E / B_W$ (formula 3), wherein $P_{WE}$ is the battery energy per weight, $B_E$ is the electric energy of the battery module, and $B_W$ is a weight of the battery module. In step S37, the minimum value of a useful loading of the electric vehicle 10 is preset. In step S38, a weight of the battery module 20 is calculated in accordance with the minimum value of the useful loading of the electric vehicle 10. The formula for calculating the weight of the battery module is: $B_W < W_C \times F_L - L_P$ (formula 4), wherein $B_W$ is the weight of the battery module, $W_C$ is an empty weight of the electric vehicle, $F_L$ is a loading coefficient of a chassis, and $L_P$ is the useful loading of the electric vehicle. From step S31 to step S38, the battery module 20 can be selected to meet the requirements of the electric vehicle performances having the minimum value of the travelable mileage of the electric vehicle 10, the maximum value of the arrangement space of the battery module 20, the maximum value of the acceptable weight of the battery module 20, the minimum value of the useful loading of the electric vehicle 10, etc.

Figure 4:
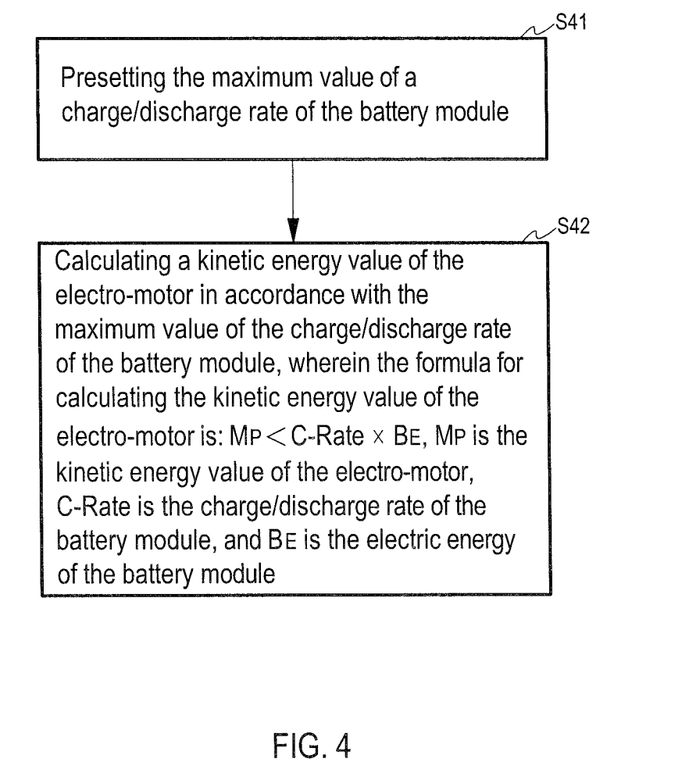
FIG. 4 is a flow chart showing the step of arranging the electro-motor module in accordance with the electric vehicle performances and the battery module according to an embodiment of the present invention.

As shown in FIG. 4, in this embodiment, step of arranging the electro-motor module 30 in accordance with the electric vehicle performances and the battery module 20 (i.e. step S40) can include the following steps. In step S41, the maximum value of a charge/discharge rate of the battery module 20 is preset. A kinetic energy value of the electro-motor 30 is calculated in accordance with the maximum value of the charge/discharge rate of the battery module 20. The formula for calculating the kinetic energy value of the electro-motor is: $M_P < C\text{-Rate} \times B_E$ (formula 5), wherein $M_P$ is the kinetic energy value of the electro-motor, C-Rate is the charge/discharge rate of the battery module, and $B_E$ is the electric energy of the battery module. From step S41 to step S42, the electro-motor module 30 can be selected to meet the requirements of the above-mentioned electric vehicle performances and battery module.

In an embodiment of the present invention, the electro-motor modules 30 having different grade kinetic energy can be 50 kW, 80 kW, 120 kW, 150 kW and 180 kW, and the battery modules 20 having different grade electric energy can be 6 kWh, 12 kWh, 18, kWh, 24 kWh, 30 kWh, 36 kWh and 42 kWh (the basic battery unit can be 6 kWh). When the minimum value of the travelable mileage of the preset electric vehicle performances is 100 km and the consumed power is 150 Wh/km, the travelable mileage of the electric vehicle can be calculated by formula of $R = B_E / C_P$, wherein $B_E$ is the electric energy of the battery module, and $C_P$ is the consumed power. As shown in the following table 1, the portions having screentone in the column show the travelable mileage of the electric vehicle.

TABLE 1

| electric energy (kWh) | travelable mileage (km) | consumed power (Wh/km) |
|---|---|---|
| | | 150 |
| 6 | | 40 |
| 12 | | 80 |
| 18 | | 120 |
| 24 | | 160 |
| 30 | | 200 |
| 36 | | 240 |
| 42 | | 280 |

Then, when the maximum value of the arrangement space of the battery module 20 of the preset electric vehicle performances is 220 liters, a volume of the battery module 20 can be calculated by formula of $B_V = B_E/P_{LE}$, wherein $B_E$ is the electric energy of the battery module, and $P_{LE}$ is the battery energy per volume. As shown in the following table 2, the portions having screentone in the columns show the volume of the battery module 20.

TABLE 2

| volume of battery module (Liter) / battery energy per volume (Wh/Liter) | | <220 | | | | |
|---|---|---|---|---|---|---|
| electric energy (kWh) | | 96 | 120 | 144 | 168 | 192 |
| battery module | 6 | 63 | 50 | 42 | 36 | 31 |
| | 12 | 125 | 100 | 83 | 71 | 63 |
| | 18 | 188 | 150 | 125 | 107 | 94 |
| | 24 | 250 | 200 | 167 | 143 | 125 |
| | 30 | 313 | 250 | 208 | 179 | 156 |
| | 36 | 375 | 300 | 250 | 214 | 188 |
| | 42 | 438 | 350 | 292 | 250 | 219 |

Then, when the maximum value of the acceptable weight of the battery module 20 of the preset electric vehicle performances is 420 kilograms (i.e. 30% of the entire vehicle), a weight of the battery module 20 can be calculated by formula of $B_W = B_E/P_{WE}$, wherein $B_E$ is the electric energy of the battery module, and $P_{WE}$ is the battery energy per weight. As shown in the following table 3, the portions having screentone in the columns show the weight of the battery module 20.

TABLE 3

| weight of battery module (kg) / battery energy per weight (Wh/kg) | | <420 | | | | |
|---|---|---|---|---|---|---|
| electric energy (kWh) | | 60 | 75 | 90 | 112.5 | 135 |
| battery module | 6 | 100 | 80 | 67 | 53 | 44 |
| | 12 | 200 | 160 | 133 | 107 | 89 |
| | 18 | 300 | 240 | 200 | 160 | 133 |
| | 24 | 400 | 320 | 267 | 213 | 178 |
| | 30 | 500 | 400 | 333 | 267 | 222 |
| | 36 | 600 | 480 | 400 | 320 | 267 |
| | 42 | 700 | 560 | 467 | 373 | 311 |

Then, when the minimum value of an useful loading of the electric vehicle 10 of the preset electric vehicle performances is 320 kilograms (i.e., it assumes that there are 4 persons in the vehicle, and each person is 80 kilograms), the empty weight of the electric vehicle is 1400 kilograms (i.e., it assumes that the empty weight includes the weight of all necessary consumptive materials of the electric vehicle, e.g. machine oil, oil box, cooling water, gear oil, etc), the loading coefficient of the chassis is 40%, the useful loading of the electric vehicle 10 can be calculated by formula of $L_P = W_C \times F_L - B_W$, wherein $W_C$ is the empty weight of the electric vehicle, $F_L$ is the loading coefficient of the chassis, and $B_W$ is the weight of the battery module. As shown in the following table 4, the portions having screentone in the columns show the useful loading of the electric vehicle 10.

TABLE 4

| useful loading of electric vehicle (kg) / battery energy per weight (Wh/kg) | | >320 | | | | |
|---|---|---|---|---|---|---|
| electric energy (kWh) | | 60 | 75 | 90 | 112.5 | 135 |
| battery module | 6 | 460 | 480 | 493 | 507 | 516 |
| | 12 | 360 | 400 | 427 | 453 | 471 |
| | 18 | 260 | 320 | 360 | 400 | 427 |
| | 24 | 160 | 240 | 293 | 347 | 382 |
| | 30 | 60 | 160 | 227 | 293 | 338 |
| | 36 | -40 | 80 | 160 | 240 | 293 |
| | 42 | -140 | 0 | 93 | 187 | 249 |

In addition, particularly in the method for organizing the electric energy and the kinetic energy of the electric vehicle according to this embodiment of the present invention, step of arranging the electro-motor module 30 in accordance with the electric vehicle performances and the battery module 20 (i.e. step S40) can include that: the maximum value of a charge/discharge rate of the battery module 20 is preset to 6. The charge/discharge rate of the battery module 20 can be calculated by formula of C-Rate=$M_P/B_E$, wherein $M_P$ is the kinetic energy value of the electro-motor, and $B_E$ is the electric energy of the battery module. As shown in the following table 5, the portions having screentone in the columns show the charge/discharge rate of the battery module 20.

The present invention is characterized in that: the electric energy and the kinetic energy matched with each other of the electric vehicle are adjustably designed by adjustable matching concept. According to the requirement of a driver, different electric energy and kinetic energy can be organized in the same chassis so as to produce different performance grade (i.e. different vehicle performance). When the vehicle performance is changed, it is not necessary to replace the electric vehicle of the present invention. The electric vehicle of the present invention can meet the requirement of short-term changing vehicle performance suitably for the use of a rental. For example, the small city vehicle having short travelable mileage can become the small city vehicle having long travelable mileage by increasing battery modules, the single-person city vehicle having short travelable mileage can become the multi-persons sport utility vehicle having long travelable mileage by increasing battery modules. Or, the electro-motor modules and the battery modules of the present invention having high cost can be shared by a user group or relatives of a family, thereby economizing the resource. The design of the electric vehicle of the present invention has the following

TABLE 5

| charge/discharge rate of battery module (C-Rate) / kinetic energy value of the electro-motor (kW) | | | <6 | | | | |
|---|---|---|---|---|---|---|---|
| | | M-P | 50 | 80 | 120 | 150 | 180 |
| electric energy (kWh) | | E-P | 60 | 96 | 144 | 180 | 216 |
| battery module | 6 | | 10.0 | 16.0 | 24.0 | 30.0 | 36.0 |
| | 12 | | 5.0 | 8.0 | 12.0 | 15.0 | 18.0 |
| | 18 | | 3.3 | 5.3 | 8.0 | 10.0 | 12.0 |
| | 24 | | 2.5 | 4.0 | 6.0 | 7.5 | 9.0 |
| | 30 | | 2.0 | 3.2 | 4.8 | 6.0 | 7.2 |
| | 36 | | 1.7 | 2.7 | 4.0 | 5.0 | 6.0 |
| | 42 | | 1.4 | 2.3 | 3.4 | 4.3 | 5.1 | advantages: according to different requirement, the electric vehicle performance grade can be adjusted; the weight of unnecessary battery module can be decreased; and the community of the chassis can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for organizing an electric energy and a kinetic energy of an electric vehicle, the method comprising the following steps of:
   providing a plurality of electro-motor modules having different grade of kinetic energy;
   providing a plurality of battery modules having different grade of electric energy;
   presetting a plurality of electric vehicle performances, and arranging one of the battery modules on the electric vehicle in accordance with the electric vehicle performances; and
   arranging one of the electro-motor modules on the electric vehicle in accordance with the electric vehicle performances and the one of the battery modules, wherein the step of presetting the plurality of electric vehicle performances and arranging the battery module in accordance with the electric vehicle performances comprises the following steps of:
   presetting the minimum value of a travelable mileage of the electric vehicle;
   calculating the electric energy of selectable battery module in accordance with the minimum value of the travelable mileage, wherein the formula for calculating the electric energy of selectable battery module is: $B_E > R \times C_P$, $B_E$ is the electric energy of the battery module, R is the travelable mileage of the electric vehicle, and $C_P$ is a consumed power;
   presetting the maximum value of an arrangement space of the battery module;
   calculating a battery energy per volume in accordance with the maximum value of the arrangement space of the battery module, wherein the formula for calculating the battery energy per volume is: $P_{LE} > B_E/B_V$, $P_{LE}$ is the battery energy per volume, $B_E$ is the electric energy of the battery module, and $B_V$ is a volume of the battery module;
   presetting the maximum value of an acceptable weight of the battery module;
   calculating a battery energy per weight in accordance with the maximum value of the acceptable weight of the battery module, wherein the formula for calculating the battery energy per weight is: $P_{WE} > B_E/B_W$, $P_{WE}$ is the battery energy per weight, $B_E$ is the electric energy of the battery module, and $B_W$ is a weight of the battery module;
   presetting the minimum value of a useful loading of the electric vehicle; and
   calculating a weight of the battery module in accordance with the minimum value of the useful loading of the electric vehicle, wherein the formula for calculating the weight of the battery module is: $B_W < W_C \times F_L - L_P$, $B_W$ is the weight of the battery module, $W_C$ is an empty weight of the electric vehicle, $F_L$ is a loading coefficient of a chassis, and $L_P$ is the useful loading of the electric vehicle.

2. The method according to claim 1, wherein the step of arranging the electro-motor module in accordance with the electric vehicle performances and the battery module comprises the following steps of:
   presetting the maximum value of a charge/discharge rate of the battery module; and
   calculating a kinetic energy value of the electro-motor in accordance with the maximum value of the charge/discharge rate of the battery module, wherein the formula for calculating the kinetic energy value of the electro-motor is: $M_P < \text{C-Rate} \times B_E$, $M_P$ is the kinetic energy value of the electro-motor, C-Rate is the charge/discharge rate of the battery module, and $B_E$ is the electric energy of the battery module.

3. The method according to claim 1, wherein each of the electro-motor modules has a kinetic energy grade of 50 kW, 80 kW, 120 kW, 150 kW or 180 kW.

4. The method according to claim 1, wherein each of the battery modules has an electric energy grade of 6 kWh, 12 kWh, 18 kWh, 24 kWh, 30 kWh, 36 kWh or 42 kWh.

5. A method for organizing an electric energy and a kinetic energy of an electric vehicle, the method comprising the following steps of:
   providing a plurality of electro-motor modules having different grade of kinetic energy;
   providing a plurality of battery modules having different grade of electric energy;
   presetting a plurality of electric vehicle performances, and arranging one of the battery modules on the electric vehicle in accordance with the electric vehicle performances; and
   arranging one of the electro-motor modules on the electric vehicle in accordance with the electric vehicle performances and the one of the battery modules, comprising:
   presetting the maximum value of a charge/discharge rate of the battery module; and
   calculating a kinetic energy value of the electro-motor in accordance with the maximum value of the charge/discharge rate of the battery module, wherein the formula for calculating the kinetic energy value of the electro-motor is: $M_P < \text{C-Rate} \times B_E$, $M_P$ is the kinetic energy value of the electro-motor, C-Rate is the charge/discharge rate of the battery module, and $B_E$ is the electric energy of the battery module.

6. The method according to claim 5, wherein each of the electro-motor modules has a kinetic energy grade of 50 kW, 80 kW, 120 kW, 150 kW or 180 kW.

7. The method according to claim 5, wherein each of the battery modules has an electric energy grade of 6 kWh, 12 kWh, 18 kWh, 24 kWh, 30 kWh, 36 kWh or 42 kWh.

* * * * *